United States Patent
Dubois et al.

(10) Patent No.: US 9,920,654 B2
(45) Date of Patent: Mar. 20, 2018

(54) INTERMEDIATE CASING EXTENSION OF IMPROVED DESIGN

(71) Applicant: Snecma, Paris (FR)

(72) Inventors: Margaux Justine Emma Dubois, Chily Mazarin (FR); Alexandre Christophe Adrien Demoulin, St Pierre du Perray (FR)

(73) Assignee: SNECMA, Paris (FR)

( * ) Notice: Subject to any disclaimer, the term of this patent is extended or adjusted under 35 U.S.C. 154(b) by 244 days.

(21) Appl. No.: 14/652,573

(22) PCT Filed: Dec. 16, 2013

(86) PCT No.: PCT/FR2013/053082
§ 371 (c)(1),
(2) Date: Jun. 16, 2015

(87) PCT Pub. No.: WO2014/096647
PCT Pub. Date: Jun. 26, 2014

(65) Prior Publication Data
US 2015/0345333 A1    Dec. 3, 2015

(30) Foreign Application Priority Data
Dec. 18, 2012   (FR) ...................................... 12 62269

(51) Int. Cl.
  *F01D 25/24*    (2006.01)
  *B64D 27/00*    (2006.01)
  (Continued)

(52) U.S. Cl.
  CPC ........... *F01D 25/243* (2013.01); *B64D 27/00* (2013.01); *B64D 29/06* (2013.01); *F01D 25/24* (2013.01);
  (Continued)

(58) Field of Classification Search
  CPC .. B64D 27/26; B64D 2027/268; B64D 29/06; F01D 25/28; F01D 25/243; F02C 7/20; F23R 3/60
  (Continued)

(56) References Cited

U.S. PATENT DOCUMENTS

| 4,534,167 A * | 8/1985 | Chee ....................... B64D 29/06 181/214 |
| 8,511,973 B2 * | 8/2013 | Ramlaoui .............. B64D 29/06 415/128 |

(Continued)

FOREIGN PATENT DOCUMENTS

| FR | 2 865 002 A1 | 7/2005 |
| FR | 2 925 120 A1 | 6/2009 |

OTHER PUBLICATIONS

Search Report issued in French Patent Application No. FR 12 62269 dated Oct. 1, 2013.

(Continued)

*Primary Examiner* — Matthew W Jellett
(74) *Attorney, Agent, or Firm* — Pearne & Gordon LLP (57) ABSTRACT

The invention relates to an extension (30) of an intermediate frame for an aircraft turbine engine, that will project downstream from an outer ring of the intermediate frame, this extension comprising a downstream annular connecting part (64) preferably forming an annular groove (66) open radially outwards, into which the nacelle cowls will fit (38), the end (64) comprising at least one first angular sector (76b). According to the invention, the extension comprises a body (77) made from a single piece comprising a junction ring (74) and at least one second angular sector (76a) of said downstream annular connecting part (64), the first angular sector being added onto the extension body (77).

12 Claims, 9 Drawing Sheets

(51) Int. Cl.
*B64D 29/06* (2006.01)
*F02K 3/06* (2006.01)
*F02C 7/20* (2006.01)

(52) U.S. Cl.
CPC .................. *F02C 7/20* (2013.01); *F02K 3/06* (2013.01); *F05D 2220/36* (2013.01); *Y02T 50/671* (2013.01)

(58) Field of Classification Search
USPC ........ 60/226.1, 226.2, 796; 415/211.2, 213.1
See application file for complete search history.

(56) References Cited

U.S. PATENT DOCUMENTS

| | | | | |
|---|---|---|---|---|
| 8,646,723 | B2* | 2/2014 | Porte | B64D 29/06 |
| | | | | 181/214 |
| 8,646,744 | B2* | 2/2014 | Duchatelle | F01D 9/04 |
| | | | | 248/637 |
| 8,727,269 | B2* | 5/2014 | Stuart | F02C 7/20 |
| | | | | 244/53 R |
| 8,985,509 | B2* | 3/2015 | Sandy | B64D 27/26 |
| | | | | 244/54 |
| 9,114,882 | B2* | 8/2015 | Robertson, Jr. | B64D 27/26 |
| 9,399,952 | B2* | 7/2016 | De Sousa | F01D 9/065 |
| 2005/0247042 | A1 | 11/2005 | Fert | |
| 2009/0155070 | A1 | 6/2009 | Duchatelle | |

OTHER PUBLICATIONS

International Search Report issued in Application No. PCT/FR2013/053082 dated Apr. 24, 2014.
Written Opinion issued in Application No. PCT/FR2013/053082 dated Apr. 24, 2014.

* cited by examiner

INTERMEDIATE CASING EXTENSION OF IMPROVED DESIGN

TECHNICAL DOMAIN

This invention relates to a propulsion assembly for an aircraft, of the type comprising a turbine engine, a nacelle surrounding the turbine engine, and an attachment pylon provided with a rigid structure and means of fastening the turbine engine on the rigid structure.

More precisely, the invention relates to an extension of the intermediate frame of the turbine engine, designed to make the interface between the intermediate frame and thrust reverser cowls of the nacelle.

The invention is more particularly applicable to a propulsion assembly comprising a turbofan, preferably a twin shaft turbofan.

STATE OF PRIOR ART

The attachment pylon, also called the EMS (Engine Mounting Structure), or "pylon" or "engine pylon", is used to suspend the turbofan below the aircraft wing, or to mount this turbofan above this wing, or to add it onto the aft part of the fuselage. It is arranged to form the connecting interface between a turbofan and a given structural part of the aircraft. It transmits forces generated by its associated turbofan to the structure of this aircraft and is also used for routing of fuel, electrical, hydraulic and air systems between the engine and the aircraft.

The nacelle is conventionally fitted with several cowls surrounding the turbofan and allowing access to the turbofan when in the open position, these cowls being known as fan cowls or thrust reverser cowls, the thrust reverser cowls being articulated onto the primary structure of the EMS.

The turbofan comprises a fan case extended backwards by a frame called the intermediate frame comprising an outer ring and a forward transverse flange and an aft transverse flange parallel to each other and arranged radially inwards from this outer ring, this intermediate frame also comprising structural arms distributed at different angles and extending radially between the aft and forward flanges as far as the outer ring. In the case of a twin shaft turbofan, the fan flow passes through the annular space between the inner and the outer rings of the intermediate frame.

This outer ring of the intermediate frame is extended in the downstream direction by an extension comprising a downstream annular connecting part for example forming an annular groove radially open outwards that will house the nacelle cowls, and more precisely a complementary shaped rib supported by these cowls, usually the thrust reverser cowls. Thus, cooperation between the rib and the complementary groove transmits aerodynamic forces from the nacelle to the turbofan during the take-off, flight and landing phases, and particularly axial forces and even more particularly axial thrust resisting forces when the thrust reverser systems fitted on the nacelle cowls are actuated.

Furthermore, simple penetration of the rib into the groove facilitates easy and fast opening of the thrust reverser cowls articulated on the pylon, this opening for example being made for performing maintenance operations on the aircraft when parked on the ground.

One disadvantage with conventional solutions lies in the fact that the annular groove, that may be continuous or interrupted along the circumference of the extension, is located within a single annular part, that would have to be entirely replaced if there is any damage to part of the groove that houses the cowls. This disadvantage is particularly severe particularly because it has been observed that the annular groove is non-uniformly loaded by the cowls along its length, such that very local wear zones appear.

It has been proposed that this problem could be solved by a solution in which the downstream annular part of the extension defining the cowl reception groove is broken into sectors. For example, one such solution is disclosed in document FR 2 925 120. The annular groove is thus built up using angular sectors arranged end to end, each fixed by bolts onto a junction ring, itself mounted on the outer ring of the intermediate frame.

Nevertheless, there is a need to further optimise the design of this extension to the intermediate frame, in terms of cost, mass and quality.

Similar problems also exist if the downstream annular connecting part includes cowl retention means in a form other than a groove open radially outwards. In this respect, these nacelle cowl retention means may for example be composed of a retention flange projecting radially outwards from said junction ring.

SUMMARY OF THE INVENTION

Therefore, the purpose of the invention is to at least partially overcome the disadvantages mentioned above, related to embodiments according to prior art.

To achieve this, the first purpose of the invention is an extension of an intermediate frame for an aircraft turbine engine that will project downstream from an outer ring of said intermediate frame, said extension comprising a downstream annular connecting part forming retention means designed to hold the nacelle cowls, said downstream annular connecting part comprising at least a first angular sector. According to the invention, said extension comprises a body made from a single piece comprising a junction ring and at least one second angular sector of said downstream annular connecting part, said first angular sector being added onto said extension body. Furthermore, the frame extension comprises a plurality of first angular sectors and a plurality of second angular sectors, all second angular sectors extending around at least 80% of the circumference of the body.

The invention is particularly advantageous in that the junction ring is made from a single piece with one or several angular sectors of the annular downstream part of the extension defining the groove. Thus, these sectors called second angular sectors, no longer need to be fixed by bolts onto the junction ring, and the global mass of the ring is advantageously reduced accordingly.

Furthermore, manufacturing costs of such an extension are lower than costs observed in the past, because it is easier to obtain the single piece extension body and faster than the solution described in document FR 2 925 120, in which the junction ring and the angular sectors of the groove are obtained separately, and these sectors are then assembled on the junction ring. Furthermore, always considering the solution described in document FR 2 925 120, there are fewer referenced parts that have to be managed for manufacturing the extension, which also reduces costs.

Also, for second angular sectors made from a single piece with the junction ring, the tolerances obtained are better than in the solution in document FR 2 925 120, in which the parts are stacked.

Furthermore, the invention maintains the advantage that when one or several first angular sectors have to be replaced, there is no longer any need to replace the entire extension, but simply the first angular sector(s) concerned. Thus, segmentation of the nacelle cowl retention means advantageously reduces the time necessary for maintenance operations performed on the extension, and also saves material. Since wear of these cowl retention means is usually limited to predetermined locations, all that is necessary is to install the first sectors that are easily replaced at these locations.

Also, the first and second angular sectors may advantageously be different from each other in terms of design and/or material depending on the load that will be applied to them. For example, in the case of the nacelle cowls concerned (preferably the thrust reverser cowls) are provided with thrust reverser systems actuated by actuator type control means, the parts of the annular retention means located facing these control means are usually the most highly loaded. An appropriate material and/or design can be thus adopted to make the angular sector(s) facing the most severely loaded parts, so that they have better wear resistance. As mentioned above, the highly loaded parts of the groove are preferably made with the first replaceable angular sectors.

Finally, by making the design such that the frame extension comprises a plurality of first angular sectors and a plurality of second angular sectors, in which all the second angular sectors extend around at least 80% of the circumference of the body, the result is that the remaining part of the circumference is entirely or partly completed by the first angular sectors.

Preferably, the first angular sectors are mounted onto the body by bolts, in recesses formed between two second directly consecutive sectors of said body.

Preferably, said first angular sectors are made from a first material, and the second angular sectors are made from a second material different from the first material. For example, the first material may be titanium or one of its alloys, and the second material may be aluminium or one of its alloys. More generally, the first material is stronger than the second material, used for the second sectors arranged at the most highly loaded locations along the extension of the intermediate frame.

Nevertheless, despite the difference in material, it is also possible that the design of the first and second sectors may be different, so as to adapt to local stresses encountered.

Preferably, each first and second angular sector comprises a portion of the retention means, this portion extending around the same angular amplitude as the sector concerned. Alternately, each sector could have a portion of the retention means around a smaller amplitude than that of the sector concerned, without going outside the scope of the invention.

According to a first preferred embodiment of the invention, said retention means are formed from a groove open radially outwards into which the nacelle cowls will fit.

According to a second preferred embodiment of the invention, said retention means are formed from a retention flange projecting radially outwards, said retention flange preferably being designed to hold the nacelle cowls by means of a holding structure clamping the retention flange and a portion of said nacelle cowls.

Another purpose of the invention is a turbine engine for an aircraft, preferably a turbofan, comprising an intermediate frame fitted at the downstream end of its outer ring with an extension like that described above.

Preferably, the junction ring of the body is fitted with an annular collar fastening the body to the downstream end of the outer ring of the intermediate frame.

Finally, another purpose of the invention is a propulsion assembly for an aircraft comprising such a turbine engine, and a nacelle comprising nacelle cowls cooperating with the retention means.

Preferably, the propulsion assembly also comprises a turbine engine EMS comprising a rigid structure and means of fastening the turbine engine on said rigid structure, said nacelle cowls thus being articulated on said rigid structure.

Other advantages and characteristics of the invention will become clear from the detailed non-limitative description given below.

BRIEF DESCRIPTION OF THE DRAWINGS

This description will be made with reference to the appended drawings among which.

DETAILED DESCRIPTION OF THE PREFERRED EMBODIMENTS

Figure 1:
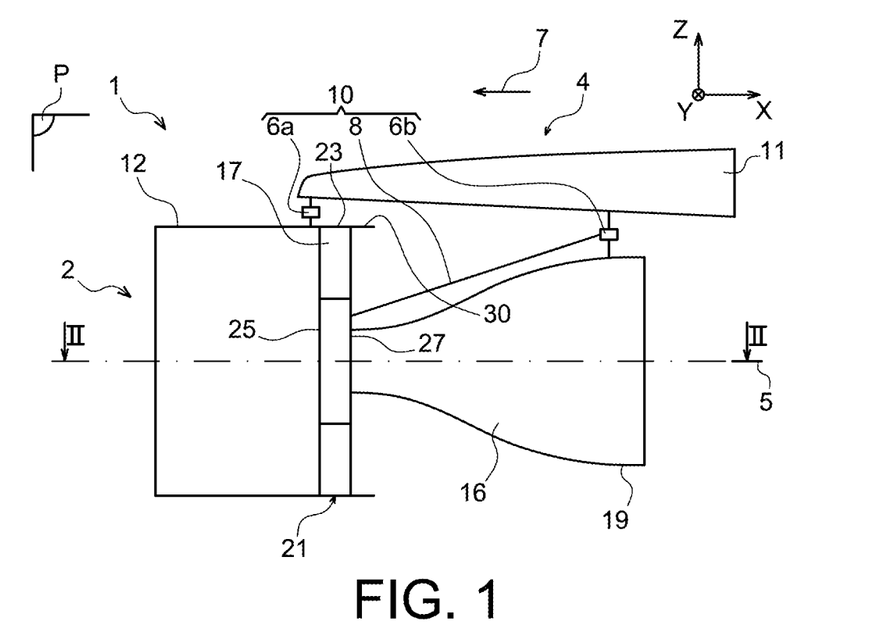
FIG. 1 shows a diagrammatic side view of a propulsion assembly for an aircraft according to this invention, the nacelle having been removed for reasons of clarity.

FIG. 1 diagrammatically shows a propulsion assembly 1 for an aircraft according to a preferred embodiment of this invention, this assembly 1 being designed to be fixed under an aircraft wing (not shown).

Globally, the propulsion assembly 1, also called the integrated propulsion system, is composed of a turbofan 2, a nacelle (not shown in this figure), and an engine pylon 4 provided with means 10 for fastening the turbofan onto this pylon, these means being preferably composed of a forward engine mounting 6a, an aft engine mounting 6b, and a system for resisting thrust forces in the form of two connecting rods 8 (one hidden by the other in FIG. 1). For information, it should be noted that assembly 1 comprises another series of mountings (not shown) to suspend this assembly 1 under the aircraft wing.

In the following description, by convention, X refers to the longitudinal direction of the assembly 1 that is also the longitudinal direction of the turbofan 2, this direction X being parallel to a longitudinal axis 5 of this turbofan 2. Y is the direction along the direction transverse to the propulsion assembly 1 and is also considered to be the direction transverse to the turbofan 2, and Z is the vertical direction or height, these three directions X, Y and Z being orthogonal to each other.

Furthermore, the terms "forward", and "aft" must be considered relative to a direction of motion of the aircraft that occurs as a result the thrust applied by turbofan 2, this direction being shown diagrammatically by the arrow 7. Similarly, the term "upstream" and "downstream" should be considered relative to a main direction of flow within the turbofan, opposite direction 7.

FIG. 1 shows only the engine mountings 6a, 6b, the thrust resistance rods 8 and the rigid structure 11 of the engine pylon 4. Other components of this pylon 4 such as the mounting means for the rigid structure 11 under the aircraft wing or the secondary structure segregating and holding the systems in place while supporting aerodynamic fairings, are not shown since they are conventional elements identical to or similar to those found in prior art, and known to those skilled in the art. Consequently, no detailed description of them will be given.

Furthermore, turbofan 2 has a conventionally global design, namely it comprises a fan case 12 at the forward end, extended in the aft direction by an intermediate frame 21.

The intermediate frame 21 comprises an outer ring 23 located in the aft aerodynamic extension of the fan case and transverse flanges 25, 27 arranged radially inwards from this outer ring 23, the intermediate frame 21 also comprising structural arms 17 distributed at different angles and extending radially between the flanges 25, 27, as far as the outer ring 23 with which they come into contact.

The turbofan also comprises a central case 16, also called the <<core>> case, extending the intermediate frame 21 in the aft direction starting from the aft transverse flange 27 to which it is attached. It should be noted that the central case extends as far as a larger aft end 19, also called the exhaust case. Finally, the outer ring 23 of the intermediate frame is extended in the downstream direction by an annular extension 30 also according to this invention, the main purpose of which is to create a connection between the outer ring 23 and the directly adjacent nacelle cowls in the downstream direction. Extension 30 will be disclosed in detail below.

The forward EMS 6a is inserted between the forward end of the rigid structure 11, also called the primary structure, and the fan case 12 or the outer ring 23 of the intermediate frame 21.

The aft EMS 6b is intermediate between the rigid structure 11 and the aft end 19 of the central case 16. A median plane P defined by the vertical and longitudinal directions and passing through the axis 5 crosses the two EMSs 6a, 6b. This plane P forms a plane of symmetry for the two thrust force resistance rods 8, the two rods being located on opposite side of plane P. Each rod 8 has an aft end articulated on a body of the aft EMS 6b, and a forward end connected onto the transverse flange 27.

Figure 2:
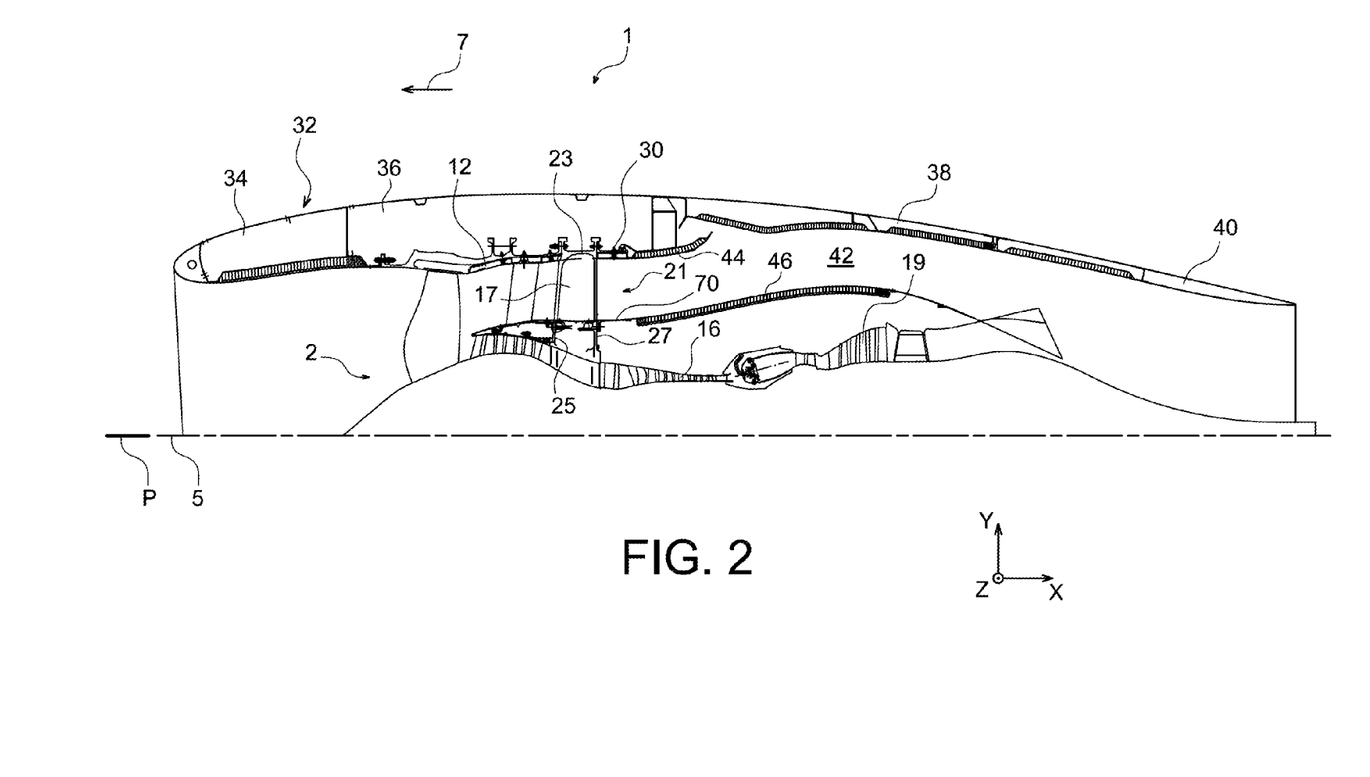
FIG. 2 shows a more detailed partial sectional view of the assembly shown in FIG. 1, taken along line II-II in this figure.

With reference to FIG. 2 that shows a more detailed view of the nacelle 32 of the propulsion assembly 1, it should be noted that the nacelle forms a continuous aerodynamic outer surface formed by an air inlet 34, fan cowls 36, thrust reverser cowls 38 and a fixed aft fairing 40, these elements being arranged adjacent to each other from the forward end towards the aft end.

The thrust reverser cowls 38 (there are usually two of them) articulated on the rigid structure of the pylon, delimit an annular fan flow duct 42 in a known manner, delimited by the outer 44 and inner 46 annular skins.

Figure 3:
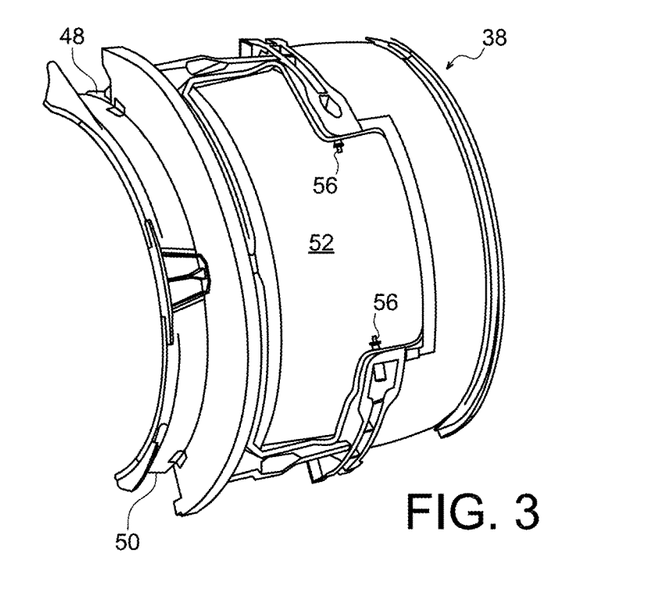
FIG. 3 shows a partial perspective view of a thrust reverser cowl, forming part of the nacelle shown in FIG. 2.
Figure 4:
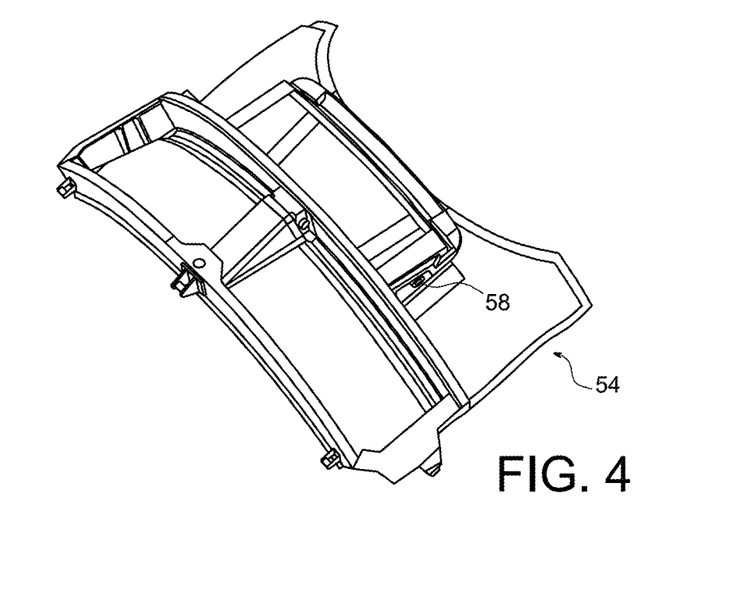
FIG. 4 shows a perspective view of a thrust reverser system that will be installed on the cowl shown in FIG. 3.
Figure 5:
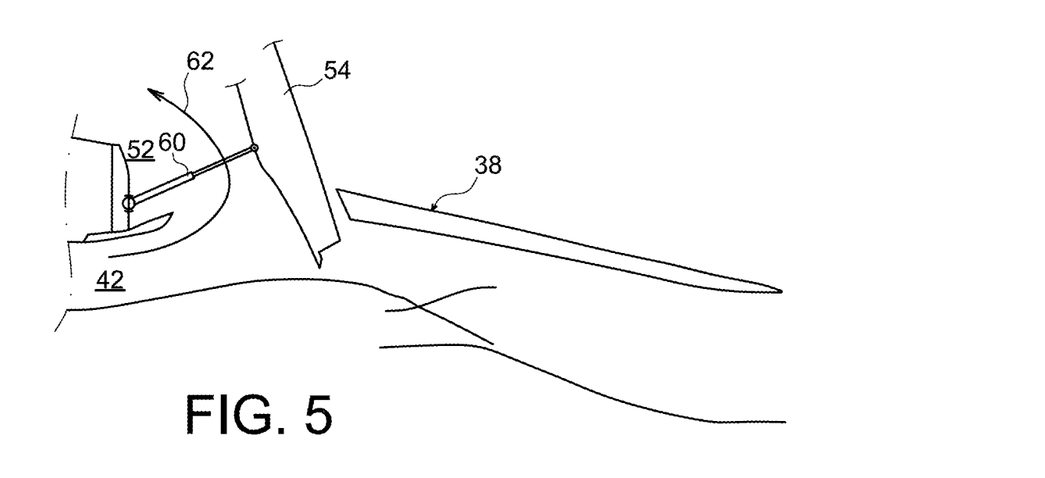
FIG. 5 shows a diagrammatic view of the thrust reverser system shown in the actuated configuration.

As shown in FIGS. 3 and 4, each thrust reverser cowl 38, also called the aft cowl or "core" cowl, has a generally semi-cylindrical shape, the upper end 48 being designed so that it is articulated on the rigid structure of the pylon, and the lower end 50 being designed to be locked to the lower end of the other cowl 38, by conventional means. It also has a housing 52 at its centre for placement of a thrust reverser system, in this case in the form of a system with a pivoting door 54 shown in FIG. 4. Therefore globally, this system 54 forms a door capable of pivoting about the axis defined by the two facing pins 56 formed in the opening 52, that will be housed in the corresponding reception orifices 58 of the door 54. Furthermore, control means such as an actuator or similar device are designed to rotate the door 54 as shown in FIG. 5 on which the extended actuator 60 holds the door 54 in the thrust reverse configuration. In this configuration, air passing through the fan flow duct 42 is forced out of the cowl 38 by the fact that this duct is blocked in the downstream direction by the inclined door 54, this extraction of air outside the nacelle taking place generally in counter current due to the inclination of this door 54, as shown by the arrow 62. For example, the actuator 60 has a forward end connected onto the frame of the housing 52 and an aft end connected onto the door itself.

Figure 6:
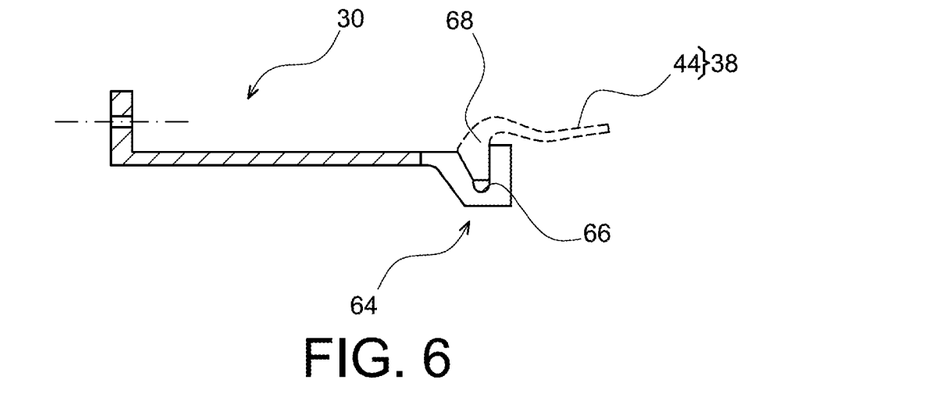
FIG. 6 shows an enlarged partial diagrammatic sectional view of the view shown in FIG. 2, representing cooperation between the extension of the intermediate frame and one of the nacelle cowls.

FIG. 6 diagrammatically shows that the cowl 38 cooperates with extension 30. In this first preferred embodiment of the invention, the extension 30 has a downstream annular connecting part 64 forming an annular groove 66 open radially outwards, into which a complementary shaped rib 68 supported on the cowl 38 fits, at the upstream end of its outer annular skin 44. In this case, the annular groove 66 represents a first manner of performing a retention function for the cowls 38.

The annular groove 66 preferably has a V-shaped section and holds the rib 68 that projects radially inwards and also has a V-shaped section. Cooperation between the rib 68 and the complementary groove 66 enables transmission of aerodynamic forces from the reverser cowl 38 to the turbofan, and particularly axial forces, and even more particularly the axial thrust resisting forces passing through the actuators 60 when the doors 54 are extended, as is the case shown in FIG. 5.

Figure 7:
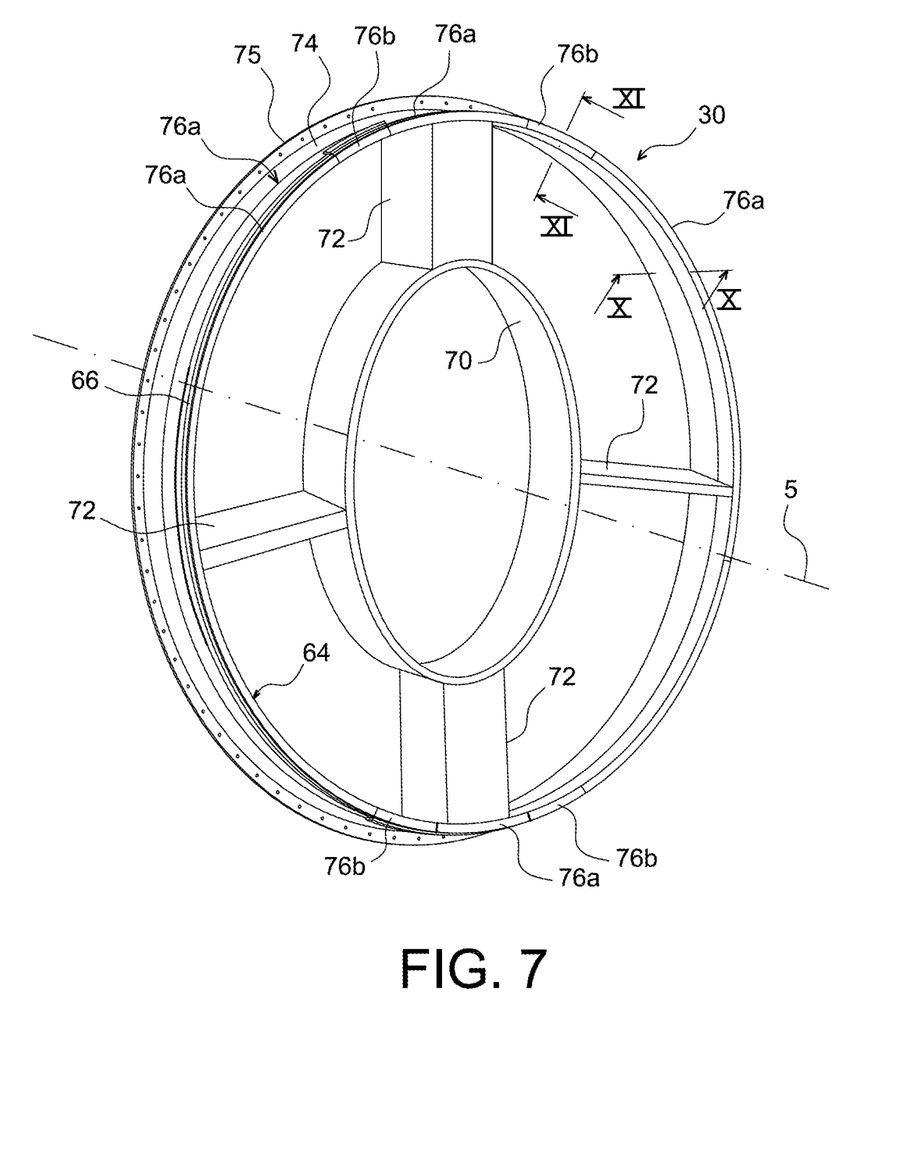
FIG. 7 shows a perspective view of the extension shown in FIG. 2, according to a first preferred embodiment of this invention.

FIG. 7 shows an arrangement also called the "thrust reverser kit", including extension 30 as the radially external end. This arrangement comprises a radially inner ring 70 designed to be centred on the axis 5 of the turbofan, the purpose of which is to make the mechanical junction with the inner annular skin 46 of the thrust reverser cowls 38. The concentric ring 70 and annular extension 30 are rigidly connected to each other through structural arms 72 arranged in the radial direction, for example there are four of them at intervals of approximately 90° from each other.

The extension 30 designed to create the mechanical junction with the outer annular skin 44 has a single-piece junction ring 74, the forward end of which in the shape of an annular collar 75 is used for a bolted attachment of the arrangement onto the downstream end of the outer ring 23 of the intermediate frame. One of the special features of this invention lies in the fact that the junction ring 74 extending around 360° forms part of an extension body 77 made from a single piece, including angular sectors 76a forming part of the downstream annular connecting end 64.

The other part of the downstream annular connecting end 64 is formed by other angular sectors 76b preferably mounted by bolts on the body 77. In the remainder of this description, sectors 76b are referred to as first angular sectors, while sectors 76a are referred to as second angular sectors.

Thus, a plurality of first and second angular sectors 76b, 76a is provided jointly forming the downstream annular connecting part 64, this part forming the downstream end of the extension 30. For example, together they form an almost continuous structure extending around 360° about axis 5, defining the annular groove 66 that may also be continuous around the circumference of the extension. Alternately, the downstream annular connecting end 64 may be interrupted at specific locations, around limited angular amplitudes.

For example, the downstream annular connecting end 64, when the groove 66 that it defines is designed to cooperate with two thrust reverser cowls, is interrupted only at the location at which the rigid structure of the pylon on which these cowls are articulated passes, and at the lower ends of these cowls. Consequently, the groove 66 and the downstream connecting end 64 usually have two diametrically opposed interruptions, preferably at 6:00 and 12:00 o'clock.

The arrangement in FIG. 7 that does not show these interruptions may be added on as is onto the intermediate frame 21 with structural arms 72 extending some structural arms 17 of this frame in the aft direction.

Therefore, this arrangement comprises the two types of angular sectors arranged alternately around the circumferential direction. The second angular sectors 76a are made from a lightweight material such as an aluminium alloy and are made in a single piece with the junction ring 74 and are located in positions in which the magnitude of forces transmitted through the thrust reverser cowls is relatively low. For example, two second sectors 76a are arranged at 3 o'clock and 9 o'clock respectively, each extending around an angular amplitude for example of more than 140°. In all, these second angular sectors 76a preferably extend around at least 80% of the circumference of the body.

They alternate with first add-on angular sectors 76b, made from a material with higher resistance to wear such as steels, titanium or its alloys. These first sectors 76b are fixed onto the single-piece body 77 at locations at which forces transmitted by the thrust reverser cowls are higher. In particular, such sectors 76b are located in line with the control actuators 60 of thrust reversal systems along the longitudinal/axial direction, regardless of whether these systems are of the "door" type as described above, or any other design known to those skilled in the art, such as the "grid" type.

In the example shown in FIG. 7, there are two first sectors 76b close to and on each side of the 12 o'clock position, and two other first sectors 76b close to and also on each side of the 6 o'clock position. Each of the four sectors 76b extends around an angular amplitude for example between 5 and 20°. In all, these first angular sectors 76b preferably extend around at least 20% of the circumference of the body.

In the example shown in FIG. 7, a second sector 76a fills in the space between the two sectors 76b in each pair, at 12 o'clock and 6 o'clock. Nevertheless, as mentioned above, the two spaces centred on these two diametrically opposed positions may remain free, interrupting the junction end 64 and its groove 66, without going outside the scope of the invention.

Figure 8A:
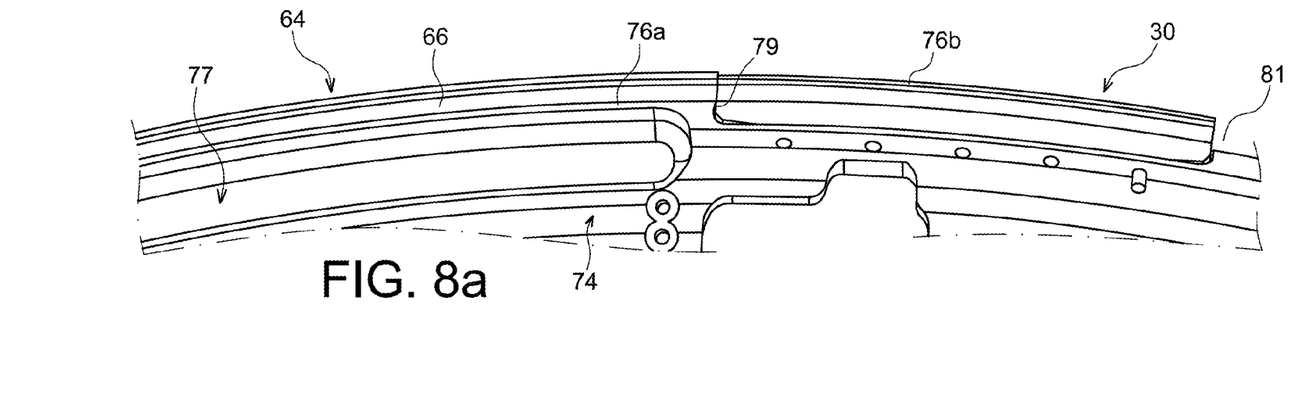
FIGS. 8a and 8b show enlarged perspective views of the upper part of the extension shown in FIG. 7, namely aft and forward views of this extension respectively.
Figure 8B:
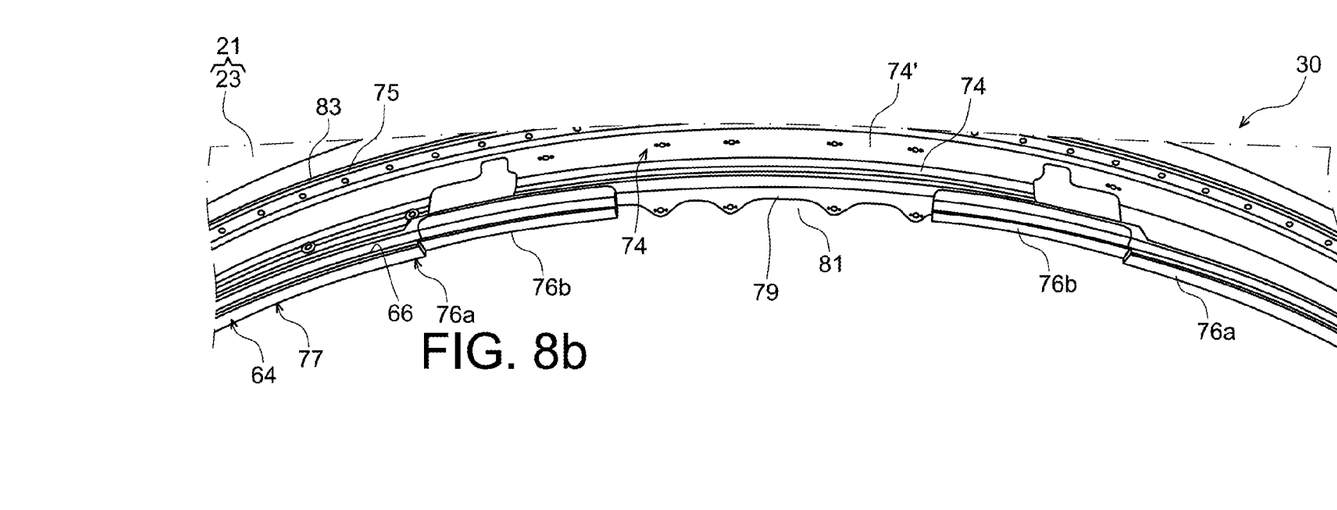

This is the solution with spaces left free at 12 o'clock and 6 o'clock that is shown partially in FIGS. 8a and 8b. These figures show the body as a single-piece 77 including the junction ring 74 and two second directly consecutive sectors 76a at a spacing from each other by a recess of material 79 formed in the body. In this recess, there are two first angular sectors 76b at the two ends of this recess 79, each in continuity along one of the two sectors 76a defining the recess. The part of the annular groove 66 defined by each second sector 76a is thus extended by a part of a groove defined by the first adjacent sector 76b. As mentioned above, in the example shown, there is a space 81 kept between the two first sectors 76b for the rigid structure of the pylon to pass through, and for attachment of the cowls to each other.

The junction ring 74 forming an integral part of the single-piece body 77, extends forwards as far as the outer ring 23 of the intermediate frame, or is connected to another ring, the forward end of which is fixed to this outer ring 23. This case is shown in FIG. 8b and in FIG. 9, on which the junction ring 74 is attached at its periphery to a forward ring 74', that includes an annular collar 75 for fastening onto the downstream end of the outer ring 23, that also includes an annular attachment collar 83. Alternately, the junction ring 74 extends forwards as far as the intermediate frame, and itself includes the collar 75 also called the attachment flange.

Figure 9:
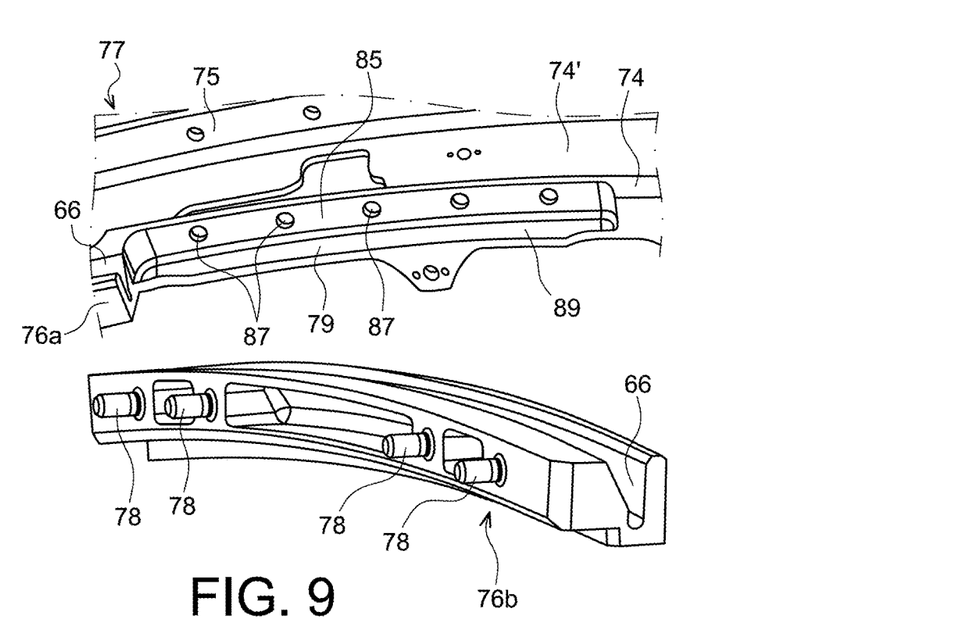
FIG. 9 shows an exploded perspective view of the part of the extension shown in FIGS. 8a and 8b.
Figure 10:
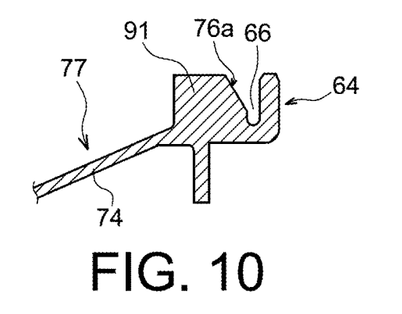
FIGS. 10 and 11 are sectional views taken along lines X-X and XI-XI in FIG. 7 respectively.
Figure 11:
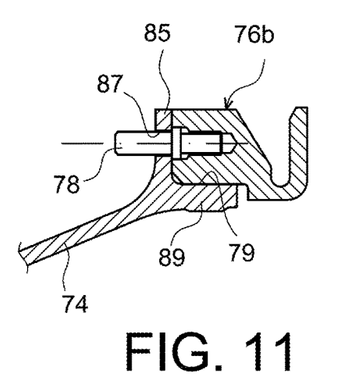

FIGS. 9 and 11 show that each first angular sector 76b is mounted by means of bolts 78 onto the body 77, in the recess 79. To achieve this, appropriate orifices 87 are drilled on a radial blank 85 that remains at the periphery of the body 77 and on which sector 76b bears in the axial direction, so that bolts can pass through these orifices. This sector also bears in the radial direction on a strip of material 89 also contributing to delimiting the recess 79, and forms a seat for this second angular sector 76b. The seat 89 and the flank 85 thus delimit a space filled in by the add-on angular sector 76b, that contrasts sharply with the single-piece solid part 91 corresponding to the second sector 76a, shown in FIG. 10.

Therefore the easily replaceable nature of the first sectors 76b is due to their screwed assembly to the extension body 77, using bolts 78 oriented approximately in the axial direction. A solution with radial bolts could also have been envisaged, without going outside the scope of the invention.

On the above figures, segmentation of the downstream connecting end 64 and its groove 66 has been shown for information. Note that the number of these angular sectors 76a, 76b, among which the first sectors 76b that have the highest mechanical loads are easily replaceable, can be varied depending on the actual needs.

Furthermore, the weight of the second angular sectors 76a can advantageously be reduced by a design different from that of the first sectors 76b. In this respect, it should be noted that sectors 76a, 76b could alternately be made from the same material and differ only in their design, or their design could be practically identical.

Finally, the body 77 is preferably made by machining, although a casting solution could also be envisaged.

FIGS. 12 to 15 show an extension 30 according to a second preferred embodiment of the invention. The specific feature in this second embodiment lies in the design of means for retaining the nacelle cowls, which instead of being a groove, are in the form of a retention flange 66 projecting radially outwards from the junction ring 74. The other elements are identical or similar to those described for the first preferred embodiment. Note also that the same numeric references on all the figures correspond to identical or similar elements.

Figure 12:
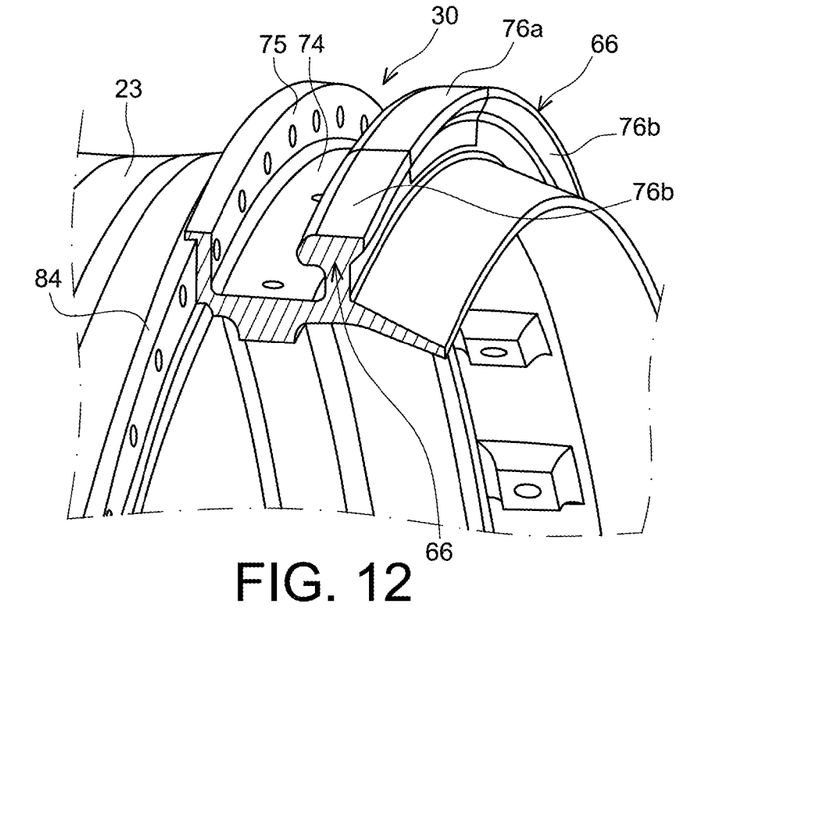
FIG. 12 shows a perspective view of the extension shown in FIG. 2, according to a second preferred embodiment of this invention.
Figure 13:
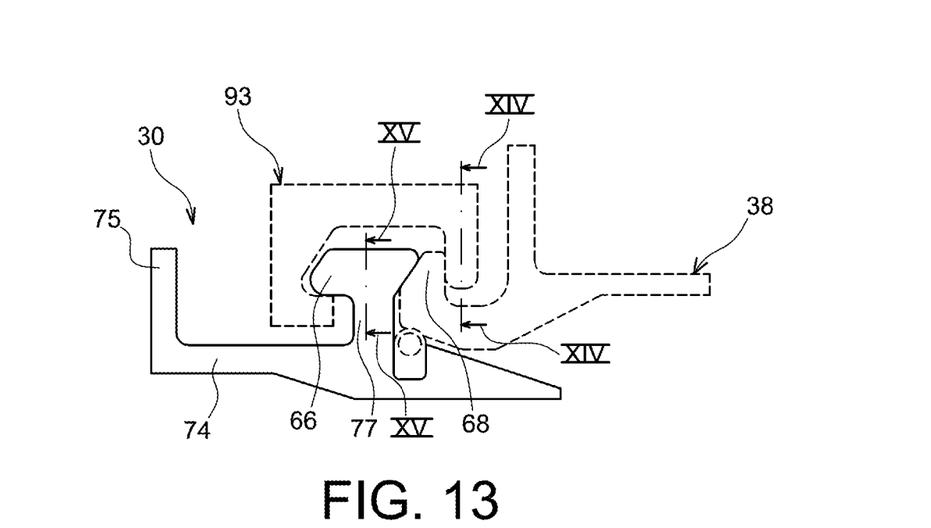
FIG. 13 shows a sectional view of the extension shown in FIG. 12, to which the nacelle and the cowl are assembled.

The annular flange 66 has the same segmented design as that of the groove described above. Therefore, it has first angular sectors 76b added onto the single-piece body 77 incorporating the junction ring 74 and second angular sectors 76a. Therefore all characteristics described with reference to the groove in the first preferred embodiment are applicable to this annular flange 66 of the second embodiment.

The flange 66 has a generally Tee-shaped section, the cross of the Tee being oriented radially outwards. It cooperates with a retaining structure 93 shown in FIGS. 13 and 14, the function of which is to clamp the flange 66 and a portion 68 of the nacelle cowls 38, this portion also being like a flange extending radially outwards. The retaining structure 93 extends continuously around the entire flange 66 and the portion of the bearing nacelle 68, or is segmented in the circumferential direction. Its section is generally in the form of a C-clamp oriented radially inwards, the two elements 66, 68 being retained within the recess defined by the C. To achieve this, the retaining structure 93 has a first branch that slides under the cross of the Tee of the flange 66, and a second opposite branch covering the portion 68, that is also in contact under the cross of the Tee of the flange.

Figure 14:
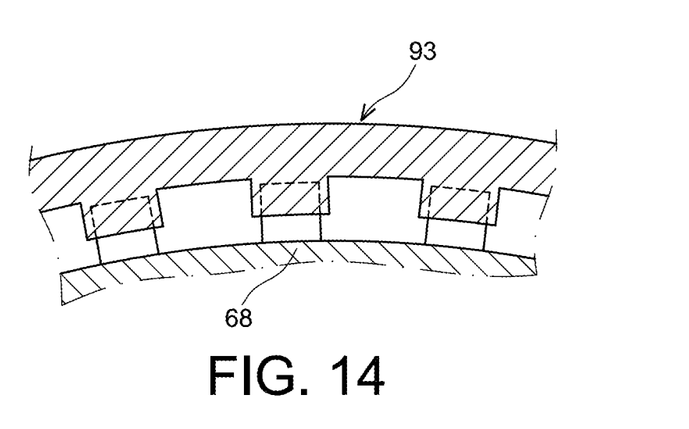
FIGS. 14 and 15 show sectional views taken along lines XIV-XIV and XV-XV in FIG. 13, respectively.
Figure 15:
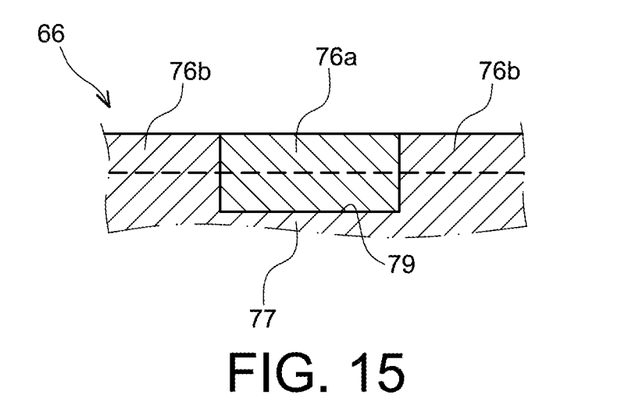

To assemble this retaining structure 93, for example there is a disengageable connection between the downstream branch of the C and the portion of the nacelle cowl 68, as can be seen in FIG. 14. Consequently, these two elements each have a succession of teeth and recesses, the teeth being facing each other in pairs so as to obtain the attachment as shown in FIG. 14. Conversely, to disassemble the nacelle cowls, the retaining structure 93 in the form of a ring is pivoted about the axis 5 so as to bring the teeth facing the recesses so that this retaining ring can be withdrawn simply by translating in the upstream direction. During operation, conventional means such as bolts screwed into the flange 66 may be used to block rotation of the ring 93. Obviously, those skilled in the art could make various modifications to the invention that has been disclosed, as non-limitative examples.

What is claimed is:

1. Extension (30) of an intermediate frame (21) for an aircraft turbine engine, that will project downstream from an outer ring (23) of said intermediate frame, said extension comprising a downstream annular connecting part (64) forming retention means (66) designed to hold nacelle cowls (38), said downstream annular connecting part (64) comprising at least a first angular sector (76b),
wherein said extension comprises a body (77) made from a single piece comprising a junction ring (74) and an integrally formed at least one second angular sector (76a) of said downstream annular connecting part (64), said first angular sector (76b) being added onto said extension body (77), and in that the extension comprises a plurality of first angular sectors (76b) and a plurality of second angular sectors (76a), a sum of all second angular sectors (76a) covering at least 80% of the circumference of the body.

2. Extension according to claim 1, wherein the first angular sectors (76b) are mounted onto the body by bolts (77), in recesses (79) formed between two second directly consecutive sectors (76a) of said body.

3. Extension according to claim 1, wherein said first angular sectors (76b) are made from a first material, and the second angular sectors (76a) are made from a second material different from the first material.

4. Extension according to claim 1, wherein said retention means are formed from a groove (66) open radially outwards, into which the nacelle cowls (38) will fit.

5. Extension according to claim 1, wherein said retention means are formed from a retention flange (66) projecting radially outwards.

6. Turbine engine (2) for an aircraft, comprising an intermediate frame (21) fitted at the downstream end of its outer ring (23) with an extension (30) according to claim 1.

7. Turbine engine according to claim 6, wherein the junction ring (74) of the body (77) is fitted with an annular collar (75) fastening the body to the downstream end of the outer ring (23) of the intermediate frame (21).

8. Propulsion assembly (1) for an aircraft comprising a turbine engine (2) according to claim 6, and a nacelle (32) comprising the nacelle cowls (38) cooperating with said retention means (66).

9. Propulsion assembly (1) according to claim 8, further comprising a turbine engine EMS (4) comprising a rigid structure (11) and means of fastening the turbine engine on said rigid structure, said nacelle cowls (38) thus being articulated on said rigid structure (11).

10. Extension according to claim 3, wherein the first material is titanium or one of its alloys.

11. Extension according to claim 3, wherein the second material is aluminium or one of its alloys.

12. Extension according to claim 5, wherein said retention flange holds the nacelle cowls (38) by means of a retaining structure (93) clamping the retention flange (66) and a portion (68) of said nacelle cowls.

* * * * *